Figure 1:
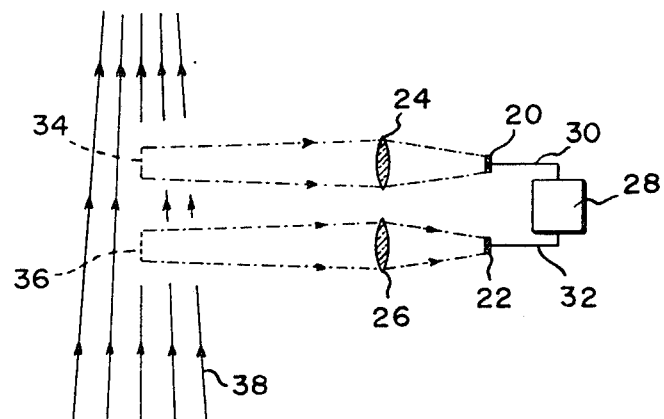

United States Patent

[11] 3,558,898

| [72] | Inventors | Myron J. Block |
| | | Nahant; |
| | | Alexander S. Zachor, Lexington, Mass. |
| [21] | Appl. No. | 583,777 |
| [22] | Filed | Oct. 3, 1966 |
| [45] | Patented | Jan. 26, 1971 |
| [73] | Assignee | Block Engineering, Inc. |
| | | Cambridge, Mass. |
| | | a corporation of Delaware |

[54] FLOW MEASUREMENT SYSTEM USING TIME CORRELATION OF TWO PHOTOCELL SIGNALS
10 Claims, 2 Drawing Figs.

[52] U.S. Cl. .................................................. 250/218,
235/181, 356/28
[51] Int. Cl. ........................................... G01n 21/26
[50] Field of Search........................................... 250/218,
210; 235/181; 356/27, 28

[56] References Cited
UNITED STATES PATENTS
2,599,975  6/1952  Carpenter .................... 250/210
3,304,535  2/1967  Lawrence .................... 235/181

OTHER REFERENCES
"The Theory, Design and Use of Correlators," Automatic Control, June 1960, p. 21

*Primary Examiner*—Archie R. Borchelt
*Assistant Examiner*—Martin Abramson
*Attorney*—Robert J. Schiller ABSTRACT: This invention is a flow measuring system using a pair of radiation detectors spaced from one another, and corresponding optical systems for imaging volume elements of a flow stream onto the radiation detectors. In one embodiment, the optical system is disposed to examine two separate volume elements spaced along the line of the flow stream. The radiation detectors provide electrical signals which are then time correlated. In another embodiment, the two optical systems have intersecting fields of view so as to examine a common volume element. One optical system is movable so that one can examine a series of common volume elements along a line substantially normal to the flow stream. The correlation of the signal from the two detectors in the latter embodiment permits measurement of the radiation profile across the flow stream.

PATENTED JAN 26 1971  3,558,898

INVENTORS.
MYRON J. BLOCK
BY ALEXANDER S. ZACHOR

Robert J. Schiller
ATTORNEY

FLOW MEASUREMENT SYSTEM USING TIME CORRELATION OF TWO PHOTOCELL SIGNALS

This invention relates to flow measurement and more particularly to electro-optical apparatus and methods for determining flow characteristics of a fluid from measurements of fluctuations in optical properties of the moving fluid.

There are a number of known methods for measuring parameters of a flow field without introducing a material probe or grid into the flow. Such methods include shadow graphs, schlieren photography, interferometry and ultramicroscopy of particles, none of which has proven particularly satisfactory for measurement of three-dimensional flows.

However, the spectral content of radiation emerging from (or absorbed by) a flame, fluid boundary layer (which on a local level is rarely, if ever, truly laminar) or other radiating gas system is related uniquely to the spatial distribution of the radiatively active gas or gases, the spatial distribution of the kinetic temperature, the spatial pressure distribution and the spatial and size distribution of any particular matter in the system that may absorb, emit or scatter radiation. These radiative effects are not independent of one another. Hence, it is possible to determine the distribution of one of them from the radiation spectrum only if the others are assumed or determined by some independent method.

The present invention, however, allows determinations of a number of space-time parameters of a turbulent radiative (i.e. absorbent, refractive or reflective) fluid by simple electro-optical means and method. It is based upon the nature of local fluctuations resulting from turbulence in a fluid, which fluctuations are irregular in time. The corresponding, irregularly fluctuating signals that originate or derive from different local volume elements within the fluid are statistically independent. Thus, one can isolate the fluctuations from different volume elements by correlating the signals received by at least two radiation detectors to obtain significant data regarding spatial and temporal characteristics of the fluid.

The principal object of the present invention is, therefore, to provide means and method for determining space-time flow parameters of a turbulent fluid from radiometric signals derived from that fluid. The term "turbulence" is intended to refer to fluid flow phenomena involving complex and irregular eddying motion of the fluid which convects momentum, heat or matter from one part of the flow to another on a molar rather than molecular scale. In other words, there are irregular fluctuations in radiometric signals (either emitted from or absorbed by) a given volume element of the fluid, due to irregularly time-varying in homogeneities in density, pressure or temperature.

One embodiment of the present invention is intended for determination of the spatial distribution of the mean flow velocity in a turbulent, radiating fluid. While particularly adapted for use with an optically thin gas as the fluid under examination, reasonably accurate results can be achieved with other fluids.

Another embodiment of the present invention is intended for determination of the distribution of temperature gradients in boundary layers or wakes in fluids.

Yet another object of the present invention is to provide a system for determining three-dimensional characteristics of a flow field.

To achieve these ends, the invention generally comprises at least a pair of radiation detectors spaced from one another, means for focusing radiation transmitted or emitted by the turbulent fluid onto the detectors, and means for correlating the time-functions of the outputs of the detectors. By moving the detectors, different regions of the fluid are brought into focus at the detectors. The effect of focusing on a particular region is to statistically isolate that region from all other regions, as is explained hereinafter. The invention therefore has the ability to probe in depth as well as laterally.

Other objects of the invention will in part be obvious and will in part appear hereinafter. The invention accordingly comprises the apparatus possessing the construction, combination of elements, and arrangement of parts and the several steps and the relation of one or more of such steps with respect to each of the others all of which are exemplified in the following detailed disclosure, and the scope of the application of which will be indicated in the claims.

Figure 2:
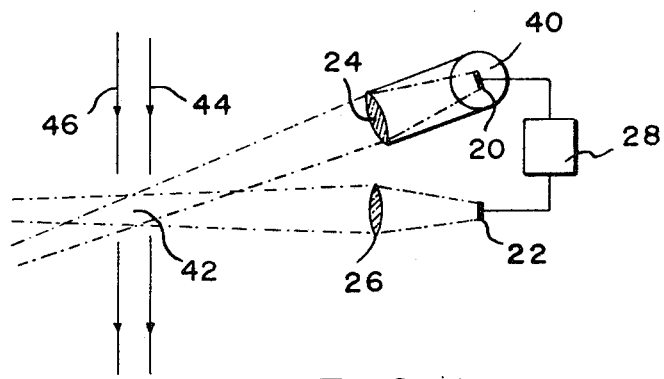

For a fuller understanding of the nature and objects of the present invention, reference should be had to the following detailed description taken in connection with the accompanying drawings wherein:

FIG. 1 is a schematic view, partly in cross sections partly in block diagram, of one embodiment of apparatus of the invention; and FIG. 2 is a schematic view, partly in cross section, partly in block diagram, of another embodiment of apparatus of the invention.

Referring now to FIG. 1 there will be seen a schematic embodiment of the invention comprising first radiation detector 20 and second radiation detector 22, spaced from one another. The spacing between the detector in one embodiment is preferably adjustable, although it will be apparent later, in an embodiment using an array or matrix of a plurality of detectors, the interdetector spacing can be fixed.

The radiation detectors typically are lead sulfide transducers, photomultipliers, or any of a number of like known devices for translating radiant energy (particularly in the spectrum from infrared to ultraviolet) into corresponding electrical signals.

Radiation collecting means, shown for simplicity as a pair of lenses 24 and 26 respectively associated with detectors 20 and 22, are provided for focusing radiant energy onto the detectors. It will be appreciated that such collecting means also can be considered as means for providing respective images in space of detectors. As will appear hereinafter, the detector image size is material in providing the desired data from the device in an optimum manner. The image size can, of course, be varied by changing the size of the detector (i.e. the photosensitive surface portion thereof) or by changing the magnification of the associated lens. The effective field of view of each lens is limited by the field stop of the system, which is effectively the size of the detector. The collector aperture size can be varied with the usual stops in the optical system. It should be noted that the choice of image size and detector spacing are dependent on one another if the magnification of the lens is changed. The angularity of the field of view, i.e. the viewing "beam," is a function of the field stop of the system and the distance of the detector from the lens. In the preferred embodiment all of the foregoing parameters are identical for each detector-lens combination.

Means, shown generally at 28, are provided for time correlating the electrical signals from the detectors and to this end, the detectors are respectively electrically coupled to correlation means 28 through appropriate leads 30 and 32.

Now, in operation, it will be appreciated that if the two identical detector-lens systems are aligned so that the detectors are coplanar and their optical axes are parallel, images 34 and 36 of detectors 20 and 22 will be coplanar in space and spaced from one another according to the spacing of the detectors. Alternatively, the radiation collecting means can be a single lens or reflective system common to both detectors, in which case, coplanar imaging of the coplanar detectors necessarily follows.

If the apparatus of FIG. 1 is located such that images of the two detectors lie in turbulent gas flow 38, then each detector will receive radiation that passes through the volume element containing the image of that detector and the aperture of its associated lens. Each detector will provide an output signal corresponding to this input radiation. The time varying output signals $O_20(t)$ and $O_22(t)$ from detectors 20 and 22 are fed to correlation means 28 which computes the cross-correlation function $R(\tau)$ defined by $$R(\tau) = \lim_{T \to \infty} \frac{1}{T} \int_0^T O_{20}(t) O_{22}(t-\tau) dt$$

in which $T$ is the time interval during which the cross-correlation is performed, and $\tau$ is the amount of time one signal is delayed relative to the other before they are correlated, i.e. multiplied and averaged with respect to time.

The convection of statistical turbulence between the viewing beams will produce a relative maximum in the function $R(\tau)$. The ratio of the peak value of $R(\tau)$ to its width at half-maximum is largest when a line between the images is aligned with the average direction of flow in the region of the images. When the images are thus aligned with the flow, the value of $\tau$ for which $R(\tau)$ is a relative maximum is equal to the time required for the turbulence to travel the distance between the images. Thus, by varying the distance between the images and by changing the relative orientation of the detectors, the direction and magnitude of the velocity can be determined for any number of points in the fluid.

Typically, correlation system 28 comprises a pair of magnetic tape recorders coupled to respective detector outputs, an analog-to-digital converter for digitizing the analogue data recorded, and a digital computer programmed to determine the time-correlation function $R(\tau)$ between the digital representations of the detector outputs. If only velocity determinations are desired, only the time shift for the first maximum in the correlation function is needed. Thus, correlation system 28 need only comprise an oscilloscope which can display both detector outputs simultaneously. The similarity (or correlation) of the signals as displayed can be estimated visually and the time lag between correlated portions quite accurately determined.

Although an optical system such as is shown in FIG. 1 is necessary for collecting radiation for the detectors, the principal contribution of the optical system is to emphasize radiative contribution (at the detectors) of statistical turbulence in two small regions of fluid 38 to deemphasize the total contributions from other regions. Only if this is accomplished will the correlation function $R(\tau)$ be related to local kinematic properties of the flowing fluid.

There are a number of other factors to be considered in describing the operation of the embodiment of FIG. 1. For example, the detector images should be comparable to the "-dimensions" of the turbulence in flowing fluid 38, i.e. the fundamental spatial frequencies, $f_{max}$., in the pressure, density and temperature fields should correspond to wavelengths that are equivalent in size to the dimensions of the detector images. Thus, the fluid properties can be determined with minimum loss of information by sampling from images spaced no farther apart than $\frac{1}{2} f_{max}$. Velocity fluctuations due to turbulence, if small compared to local mean velocity in fluid 38, have only a small effect on determination of $R(\tau)$. The correlations will be smaller as the absorptance of the fluid to radiation between images and collecting aperture increases. For this reason, the present invention finds its preferred use with fluids that are optically thin gases.

It should be noted that, with respect to the nature of lenses 34 and 36, the frequency transfer function of lenses generally is such that the longer the focal length the more poorly will the lens transfer high frequencies in depth. Of course, the shorter the focal length (i.e. the smaller the $f$ number) the more sharply will the lense limit the depth of focus and, therefore, delineate the precise volume providing the radiation of interest. Thus, the lenses are selected so that they preferably have an $f$ number which will provide a wide cone angle on the object side (toward the flow field) and, on the detector side, a longer conjugate distance (i.e. a narrower cone angle) to reduce transfer of high frequencies in depth. In this manner, the flow field can be examined in three dimensions.

The principles of the present invention are applicable to measurement of the radiation profile across a turbulent boundary layer such as the hypersonic boundary layer about a nose cone of a missile or in the wake of a high speed vehicle. The boundary layer thickness is readily deducible from the radiation gradients across the layer and if the radiation is thermal, it is also useful for estimating other thermodynamic and chemical properties. Laminar boundary layer flow at high Reynolds number will eventually become turbulent after a fluid has traveled a sufficient distance which can be determined empirically.

Apparatus for accomplishing the foregoing is shown schematically in FIG. 2 and comprises a pair of spaced-apart radiation detectors 20 and 22, and a pair of lenses 24 and 26 for respectively collecting radiation and focusing the radiation on detectors 20 and 22. One of the lens-detector assemblies, such as lens 24 and detector 20, is mounted on means, such as turntable 40, for moving the lens-detector combination so that the viewing beams, incident on the detectors, intersect to define a common volume shown at 42. Detectors 20 and 22 are connected through leads 30 and 32 to electronic time-correlating system 28.

It will be appreciated that the two detectors will therefore simultaneously examine common volume 42 from different vantage points. By virtue of turntable 40, the beam of lens 24 can be made to scan along the beam of lens 26, thereby shifting the location of the common volume 42. Assuming that the boundary layer of fluid flow is defined by flow lines 44 and 46 and the radiant intensity from elements within the layer are functions of time, the scanning of the beam of lens 24 will shift volume 42 through the boundary layer. When volume 42 lies wholly to either side of the boundary layer, a given radiation effect due to turbulence will cause signals with simultaneous correlative portions to appear at the detector outputs.

Now, both detector outputs contain signals unique to each detector and common to both detectors. These output signals can be cross-correlated in known manner in correlation system 28 by multiplication and integration to determine the nature of the radiation from a commonly detected source.

For example, both signals are amplified and the signal from one detector is applied to the electromagnet of a typical Hall-effect multiplier, the signal from the other detector being applied to the thin film of the multiplier. The multiplier output is the vector cross-product of the two inputs. If one considers taking an integral over a short period of time, the integrand is approximated very nearly by the argument of the integral where the function being integrated fluctuates slowly compared to the integration interval. Where the radiation fluctuations from common volume 42 are comparatively slow, the multiplier circuit can, therefore, be considered to be an instantaneous integrator and its vector cross-product output is adequate to approximate the desired integral. On the other hand, if larger correlation times are desired, an integrating circuit of the usual type can be added to integrate the multiplier output.

As the one beam scans the other, shifting the position of common volume 42, the cross-correlation function for simultaneous phenomena is continuously determined by system 28. The location and dimensions of the boundary layer can then be readily determined trigonometrically, for example by the angular displacement between the two beams, or, assuming a known scanning velocity, by the time required to scan through a distance representing the maximum correlation function.

It will be appreciated that the invention as thus described includes a pair of detectors, but is not so limited. Indeed, a mosaic or large array of detectors can also be used and the correlation between the outputs of any pair of pairs readily determined. It will be apparent in such case that the detectors can be fixedly positioned with respect to one another such that each detector pair examines a fixed spatial location or volume element. A sufficient number of detectors can then be arranged to examine a large plurality of volume elements through judicious selections of given detector pairs.

Since certain changes may be made in the above apparatus and method without departing from the scope of the invention herein involved it is intended that all matter contained in the above description or shown in the accompanying drawing shall be interpreted in an illustrative and not in a limiting sense.

We claim:

1. Apparatus for determining flow characteristics of a flowing fluid, and comprising in combination:
    means for defining a first discrete beam of radiation from a volume element of said fluid;
    first radiation detection means diaposed for detecting said first beam and for providing an electrical signal responsively thereto;
    means for defining a second discrete beam of radiation from a volume element of said fluid;
    second radiation detection means disposed for detecting said second beam and for providing an electrical signal responsively thereto; and
    means for time correlating said signals.

2. Apparatus as defined in claim 1 wherein said detecting means are spaced from one another.

3. Apparatus as defined in claim 1 wherein said means for defining said beams comprises means for providing an image of each of said detection means at a unique spatial position defined by a corresponding one of said volume elements and wherein said means for time correlating said signals comprises means for determining the time delay between correlative portions of said signals.

4. Apparatus as defined in claim 3 wherein said volume elements are spaced from one another and said images are comparable to the maximum wave length of the pressure, density and temperature fields within the turbulence of said fluid.

5. Apparatus as defined in claim 4 wherein the images of said detection means are alignable along a line parallel to the mean flow direction of said fluid.

6. Apparatus as defined in claim 1 wherein said means for defining said beams are positioned with respect to one another so that said volume elements are coincident and define an intersecting volume common to both beams, and wherein said means for time correlating comprises means for determining simultaneous correlative portions of said signals.

7. Apparatus as defined in claim 6 wherein at least one of said means for defining said beams is movable with respect to the other so as to permit the intersecting volume to be scanned along one of said beams.

8. Apparatus as defined in claim 6 wherein said means for cross-correlating comprises means for multiplying and integrating said electrical signals.

9. Method for measuring flow characteristics of a flowing fluid and comprising the steps of:
    continuously measuring from one position radiation from a volume element of said fluid;
    Continuously measuring from another position radiation from a volume element of said fluid; and
    determining a cross-correlation time function between the measurements.

10. Method as defined in claim 9 including the step of selecting said volume elements so as to change their alignment or spacing or both relative to mean flow direction or flow boundaries or both of said fluid.

PO-1050
(5/69)

UNITED STATES PATENT OFFICE
CERTIFICATE OF CORRECTION

Patent No. 3,558,898  Dated January 26, 1971

Inventor(s) Myron J. Block and Alexander S. Zachor

It is certified that error appears in the above-identified patent and that said Letters Patent are hereby corrected as shown below:

Column 1, line 49, the words "in homogenities" should read --inhomogeneities--.

Column 2, line 70, the words "$O_2O(t)$ and $O_22(t)$" should read --$O_{20}(t)$ and $O_{22}(t)$--.

Column 5, line 6, the word "diaposed" should read --disposed--.

Signed and sealed this 11th day of May 1971.

(SEAL)
Attest:

EDWARD M. FLETCHER, JR.
Attesting Officer

WILLIAM E. SCHUYLER,
Commissioner of Paten